United States Patent Office 3,046,800
Patented July 31, 1962

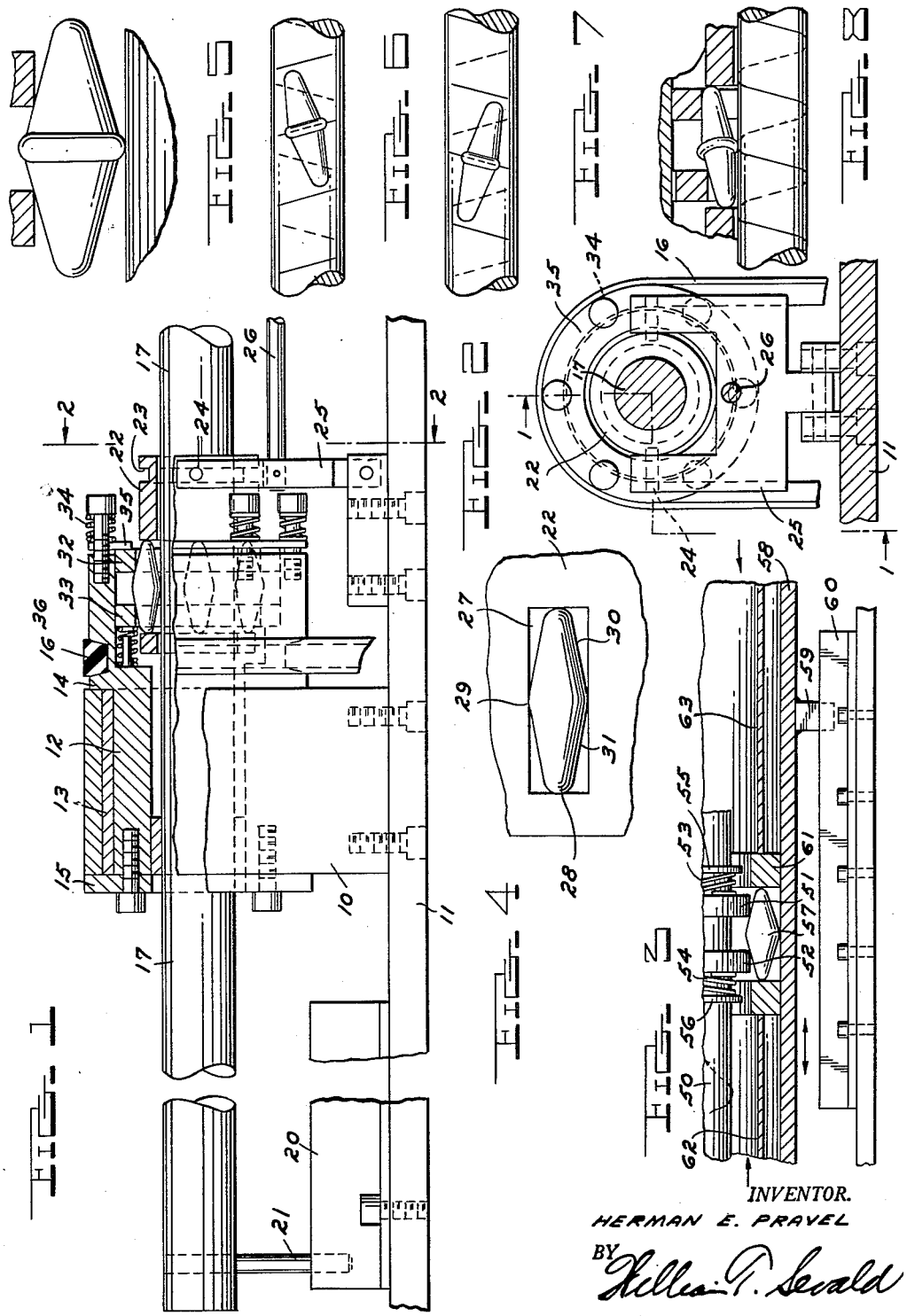

3,046,800
BI-DIRECTIONALLY MECHANICALLY
MOVED SHAFT
Herman E. Pravel, 1275 Robson Lane, Bloomfield Township, Oakland County, Mich.
Filed May 8, 1961, Ser. No. 108,457
7 Claims. (Cl. 74—25)

This invention relates to a device for converting the rotational movement of one member to axial movement of another member via planetary rollers.

Axially moved members have been employed heretofore such as in hydraulic and pneumatic cylinders to effect desired action in other devices, however, the several devices of the prior art have not proven entirely satisfactory inasmuch as they are complicated in design and construction, expensive to manufacture, difficult to use, difficult to maintain in satisfactory use condition, and are cumbersome in that they require much additional equipment such as fluids, tanks, pumps, pressure chambers, reservoirs, and lines.

With the foregoing in view, it is the primary object of the invention to provide a device having a mechanically axially actuated member which is selectively movable in opposite directions at variable rates and which is simple in design and construction, inexpensive to manufacture, easy to use, easy to maintain in use condition, and which does not require any auxiliary cumbersome and expensive equipment.

An object of the invention is to provide a rotationally secured axially movable member concentrically disposed and spaced from an axially secured rotationally movable member.

An object of the invention is to convert the rotational movement of one member to axial movement in the other member via planet rollers disposed between the members.

An object of the invention is to provide cam portions on the rollers engaging camming rings on the rotatable member imparting rotational drive to the rollers causing them to planetwise roll around the axially movable member in an orbit.

An object of the invention is to provide means axially moving said camming rings relative to said roller cam portions to urge said rollers into forced engagement with the axially movable member.

An object of the invention is to provide a compound curved central portion on the rollers making point contact with the axially movable member at any one time.

An object of the invention is to roll the rollers relative to the axially movable member so that the point contacts of the rollers describe a line of contact on the axially movable member.

An object of the invention is to provide a sleeve race freely concentrically disposed between the members circumferentially and endwise caging the rollers and which rotates with the rollers in their planetary orbit.

An object of the invention is to provide rollers having an independent axis normally parallel to the concentric member's axis so that the line of contact between the rollers and the axially movable member is normally circumferential imparting no axial thrust.

An object of the invention is to provide means for axially moving the sleeve race against the ends of the rollers to force the roller's axis out of parallel with the concentric member's axis so that the line of contact between the rollers and the axially movable member is at a helical angle imparting axial thrust.

An object of the invention is to utilize the traction between the rollers and the shaft to lock the shaft axially stationary when the line of contact is circumferential or helix angle zero under rotational conditions and also to lock when there is no relative rotation between the parts regardless of helix angle to eliminate axial drifting or creeping of the shaft.

An object of the invention is to provide means for selectably varying the roller line of contact from zero helix angle to an angle on either side of zero relative to the axially movable member so that the rollers describe a helical line of contact relative to the axially movable member in either axial direction in conjunction with unidirectional rotation movement to move the axially movable member.

These and other objects of the invention will become apparent by reference to the following description of a rotary to lineal motion converter having a mechanically actuated axial thrust which is selectively operated as to amplitude, force, and direction of movement embodying the invention taken in connection with the accompanying drawing in which:

FIG. 1 is a side elevational view of the device, partly in cross-section taken on the line 1—1 of FIG. 2, with parts broken away to reduce length.

FIG. 2 is a cross-sectional view of FIG. 1 taken on the line 2—2 thereof.

FIG. 3 is a view similar to FIG. 2 showing a reverse construction.

FIG. 4 is an enlarged partial plan view of the sleeve socket and roller.

FIG. 5 is a top plan diagrammatic view of the roller and a portion of the shaft showing the roller at an angle describing a helix on the shaft to cause thrust in one direction.

FIG. 6 is a view similar to FIG. 5, showing thrust in the other direction.

FIG. 7 is a side elevational view of a portion of the shaft and a roller showing a zero helix angle and showing the large compound curved center portion of the roller point contact in more detail; and FIG. 8 is a cross-sectional view similar to the cross-sectional portion of FIG. 1 showing the sleeve thrust to the left with the roller canted and angled relative to the rings and shaft.

Referring now to the drawing wherein like numerals refer to like and corresponding parts throughout the several views, the rotary motion to lineal motion converter device comprises an axially movable rotationally secured first member having an annular surface, an axially secured rotationally movable second member having an annular surface with the members' annular surfaces being concentrically disposed about an axis in spaced relationship to one another. Spaced opposed camming rings are disposed on and rotate with the second rotatable member and rollers are disposed between the camming rings and the first axially movable member with the rollers having a central contact portion contacting the first member annular surface. The rollers have paired opposed tapered cam portions riding the camming rings with the camming rings axially exerting force thereagainst to cam the rollers toward the first member to force the roller central contact portion into frictional engagement therewith. A sleeve race endwise and sidewise or circumferentially contains and locates the rollers and the rollers and sleeve race planetwise rotate between the members with the roller's axis normally lying parallel to the member's axis and with the plane of the roller central contact portion at a right angle to said member's axis defining no helix angle to the first member annular surface so that planetwise rotation of the rollers when axially parallel to the member's axis exerts no axial thrust. Means are provided for exerting axial force on the sleeve race to axially urge the rollers against one of the camming rings to increase the force therebetween to bias the rollers to throw their axis out of parallel with the member's axis to position the plane of said roller's central portion at a helical angle relative to the first axially movable member to effect axial thrust on the first member as the rollers rotate relative thereto.

In an exemplary embodiment of the invention, a housing 10 supported on a base 11 rotatably journals the hollow hub 12 via bearing 13 which hub is held against axial movement by the hub shoulder 14 and the housing end plate 15 and which is rotationally driven by the V-belt 16. The shaft 17 lies concentric within the hub 12 and is held against rotation by the track guides 20 and the pin 21. Sleeve race 22 freely surrounds the shaft 17 within the hub 12 and is moved axially of shaft and hub via circumferential groove 23, pin 24, yoke 25, and push-pull rod 26. The sleeve race 22 has roller sockets 27 and the rollers 28 are disposed therein in sidewise and endwise caged abutting condition with the rollers each having a large central compound curved contact portion 29 having a spherical or arcuate face making point contact with the peripheral surface of the shaft 17; the sleeve race 22 is rotationally free to turn with rollers as they roll in a planetary orbit about the shaft 17. The rollers 28 also have opposed cam portions 30 and 31 on either side of the central portion 29 tapering endwise outwardly constituting opposed cam surfaces.

Paired, opposed camming rings 32 and 33 surround the roller cam portions 30 and 31 respectively radially confining the rollers in the sleeve race sockets 27 and urging the rollers 28 radially against the shaft 17. The camming rings 32 and 33 are located and driven by hub 12 contact and are urged axially toward one another by the springs 34 and plate 35 on one axial side and by the springs 36 on the other axial side. Hub 12 rotation is transferred to the rollers 28 by the rings 32 and 33 causing the rollers to roll in a planetary orbit about the rotationally stationary shaft 17 with the sleeve race 22 rotating at the orbital speed.

When no rotation is occurring among the parts, the rollers 28 with their axis at an angle to the shaft axis in the drive position or with their axis parallel relative to the shaft axis at the null position lock the shaft against axial movement as the rollers are locked against axial movement by the cam rings.

When rotation is occurring among the parts with the roller's axis parallel to the shaft axis, the null position obtains and the roller's line of point contact is described on the shaft surface circumferentially or at zero helix angle as seen in FIGS. 1–4 and 7 locking the shaft against axial movement and neutralizing or nullifying axial thrust from the rollers to the shaft.

When rotation is occurring among the parts with the roller's axis at an angle to the shaft axis, the drive condition obtains and the roller's contact portion 29 line of contact is described helically on the shaft surface at more than a zero helix angle as seen in FIGS. 5, 6, and 8 producing an axial thrust between the rollers and the shaft causing the shaft to move axially on the helix angle of the roller compound curved central portion line of contact with the shaft surface as the rollers are blocked against axial movement by the rings and hub. With the roller line of contact angularly on one side of zero, the shaft is thrust in one axial direction and with the roller line of contact angularly on the other side of zero the shaft is thrust in the other direction.

To effect the drive condition in one direction, with the hub rotating counter clockwise as seen in FIGS. 1, 2, 5, and 8, the rod 26 is pushed to the left moving the sleeve race 22 to the left and pushing the rollers 28 to the left increasing the pressure between the roller cam 31 and the camming ring 33 at the left and decreasing pressure between the roller cam 30 and the camming ring 32 at the right causing the left cam 31 to nose under and angularly cant under the ring 33 at the left and letting the right cam 30 rise and angularly cant at the right ring 32 with the direction of rotation pulling the nosed under left cam 31 forwardly rotationally and letting the risen right cam 30 move rearwardly rotationally thereby angularly disposing the plane of the roller compound curved large center portion 29 line of contact with the surface of the shaft at an angle thereby having each roller line of contact describe a helix relative to the shaft surface on the right side of zero helix angle causing the shaft to move to the left as the applied line of contact of the roller center portion urges the rollers to the right, and since they cannot axially move, the shaft moves axially to the left. Obviously pull on the rod to the right effects shaft movement in the opposite direction.

The axial spring pressure on the camming rings 32—33 is variable as shown but may be non-variable or the springs may be eliminated and the force applied to the camming rings mechanically adjustably or built in fixedly as desired.

Due to the slight slope of the roller tapered cam surfaces 30 and 31 against the camming rings 32—33, relatively low axial pressure on the camming rings producing a high coefficient of friction between the roller surface point contact with the shaft peripheral surface thereby highly augmenting the already high coefficient of friction inherent in point contact. Movement by the sleeve race axially pushing the rollers endwise adds axially directed force to the cam engagement between roller tapered portions and the camming rings increasing the radial thrust of the roller's point contact with the shaft.

By increasing the push or pull force on the rod 26, the angular relationship and force relationship of the rollers 28 relative to the shaft 17 is increased in amplitude and angular disposition causing an increased axial movement of the shaft in the desired direction and obviously this can be augmented as far as speed of axial movement of the shaft is concerned by also increasing the rotational speed of the hub.

The initial compression of the cam rings towards one another develops the inital bearing or contact force between the roller and the shaft and sleeve force biasing or canting the rollers is additive thereto.

In the embodiment shown in FIG. 3, the shaft 50 is axially secured and rotationally driven and carries the camming rings 51 and 52 which are slidably keyed thereon and urged toward one another by the springs 53 and 54 as abutted by the collars 55 and 56 and the camming rings contact the tapered cam portions of the rollers 57 urging them radially outwardly against the hub or cylinder 58 which is axially movable and secured against rotation by the dog 59 traveling in the track 60. The sleeve race 61 is freely disposed between the shaft 50 and hub 58 and has sockets endwise and sidewise caging and locating the rollers 57. The race 61 is urged axially by either one of the thrust tubes 62 and 63 to jam the roller tapered cam portions into increased force contact with the opposite camming ring to cant the rollers at an angle relative to the hub 58 surface to describe a helix angle as hereinbefore described in conjunction with the device of FIGS. 1 and 2.

In operation, by thrusting the tube 63 to the left, the rollers 57 move into increased force contact with the camming ring 52 jamming them out of parallel axial relationship with the hub 58 so that the rollers' 57 central portions angularly roll against the surface of the hub 58 in a helical path thrusting the hub axially as the rollers move rotationally; thrust on the opposite thrust tube 64 causes axial movement of the hub 58 in the opposite direction.

It has been found with a one inch shaft and three thousand pounds' radial pressure exerted by the rollers on the shaft that the device produces seven hundred fifty foot pounds of thrust in either direction with a good amplitude of axial movement such as 36 inches per second relative to normal hub rotational speed.

The inventive mechanical rotary motion to lineal thrust devices with the features described constitute compact, durable, and neat appearing mechanisms easily operated to selectively move axially in either direction and the device is substantially complete in itself obviating expensive auxiliary equipment.

Although but two embodiments of the invention have been shown and described in detail, it is obvious that many changes may be made in the size, shape, detail, and arrangement of the various elements of the invention within the scope of the appended claims.

I claim:

1. A mechanical rotary motion to lineal motion converter device comprising an axially movable rotationally secured first member having an annular surface, an axially secured rotationally movable second member having an annular surface; said members being concentrically disposed about an axis with their annular surfaces in spaced relationship to one another; spaced opposed camming rings on and rotating with said second member spaced from said first member annular surface, rollers disposed between said camming rings and said first axially movable member annular surface; said rollers having an axis and a contact portion located in a plane transverse to said roller axis radially contacting said first axially movable member annular surface; said rollers having paired opposed cam portions riding said camming rings with said camming rings exerting force thereagainst to cam said rollers radially toward said first axially movable member surface to drive said roller contact portion into frictional engagement therewith; a sleeve race concentrically disposed between said members endwise and sidewise containing and locating said rollers; said rollers and sleeve race planetwise rotating between said rotationally secured and rotationally movable members; said roller's axis normally lying parallel to said member's axis with the plane of said roller contact portion at a right angle to said member's axis defining no helix angle relative to said first axially movable member annular surface so that planetwise rotation of said rollers relative to said first axially movable member exerts no axial thrust; and means for axially moving said sleeve race against said rollers to urge said rollers against one said camming ring to increase the force therebetween to move and cant said rollers with their axis out of parallel with said member's axis to position the plane of said rollers contact portion at an angle on one side of a right angle relative to the member's axis to describe a helix relative to said first axially movable member surface by the line of contact therebetween as said rollers rotate relative thereto to effect axial thrust to axially move said axially movable first member.

2. A mechanical rotary motion to lineal motion converter device comprising an axially movable rotationally secured first member having an annular surface, an axially secured rotationally movable second member having an annular surface; said members being concentrically disposed about an axis with their annular surfaces in spaced relationship to one another; spaced opposed camming rings on and rotating with said second member spaced from said first member annular surface, rollers disposed between said camming rings and said first axially movable member annular surface; said rollers having an axis and an intermediate compound curved contact portion located in a plane transverse to said roller axis radially contacting said first axially movable member annular surface; said roller's intermediate contact portion riding said camming rings with said camming rings exerting force thereagainst to cam said rollers radially toward said first axially movable member surface to drive said roller intermediate portion into frictional engagement therewith; race means concentrically disposed between said members endwise and circumferentially containing and locating said rollers; said rollers and race means planetwise rotating between said rotationally secured and rotationally movable members; said roller's axis normally lying parallel to said member's axis with the plane of said roller intermediate contact portion at a right angle to said members axis defining no helix angle relative to said first axially movable member annular surface so that planetwise rotation of said rollers relative to said first axially movable member exerts no axial thrust; and means for moving said race means relative to said rollers to move and cant said rollers with their axis out of parallel with said member axis to position the plane of said rollers intermediate contact portion at an angle on one side of a right angle relative to the member's axis to describe a helix relative to said first axially movable member surface by the line of contact therebetween as said rollers rotate relative thereto to effect axial thrust to axially move said axially movable first member.

3. A device for axially moving a shaft selectively as to the direction and amplitude of movement comprising a housing having an annular chamber, a hollow hub rotatably disposed in said chamber, means preventing axial movement of said hub relative to said housing; means for rotatably driving said hub, a sleeve disposed in said hub having radial slots constituting roller sockets, double tapered rollers having opposite ends disposed in said sleeve sockets, a shaft freely disposed in said sleeve in contact with said rollers radially inwardly thereof, a first camming ring disposed in said hub contacting said roller's one tapered end thereof radially outwardly of said rollers, a second camming ring disposed in said hub contacting said roller's the other tapered end radially outwardly of said rollers; means driving said camming rings on said roller tapers, and movement means on said sleeve directionally selectively axially biasing said sleeve to urge said rollers' tapers selectively to angularly cant said rollers as desired relative to said shaft to change the applied angle of said rollers relative to said shaft to cause said shaft to move in the axial direction desired, and means preventing rotational movement of said shaft so that the angular application of force of said rollers as they rotate around said shaft at an angle thereto with said hub, rings, and sleeve causes axial movement of said shaft.

4. A device for axially moving a hub selectively as to the direction and amplitude of movement comprising a rotatably disposed shaft, means preventing axial movement of said shaft, means for rotatably driving said shaft, a sleeve disposed around said shaft having radial slots constituting roller sockets, double tapered rollers having opposite ends disposed in said sleeve sockets, a hub freely disposed around said sleeve in contact with said rollers radially outwardly thereof, a first camming ring disposed on said shaft contacting said roller's one tapered end thereof radially inwardly of said rollers, a second camming ring disposed on said shaft contacting said roller's other tapered end radially inwardly of said rollers; means driving said camming rings on said roller tapers, and movement means on said sleeve directionally selectively axially biasing said sleeve to urge said rollers' tapers selectively angularly cant said rollers as desired relative to said hub to change the applied angle of said rollers relative to said hub to cause said hub to move in the axial direction desired, and means preventing rotational movement of said hub so that the angular application of force of said rollers as they rotate around said hub at an angle thereto with said shaft, rings, and sleeve causes axial movement of said hub.

5. A device for selectively axially moving a shaft comprising a rotatably disposed hollow hub, means preventing axial movement of said hub, means for rotatably driving said hub, a socketed sleeve disposed in said hub, rollers having a ball portion and opposite ends disposed in said sleeve sockets, a shaft disposed in said sleeve in contact with said roller ball portion on the radially inner side of said rollers; paired opposed camming rings on said hub contacting said roller ball portion radially outwardly of said roller; and axial push-pull means on said sleeve selectively axially moving said sleeve to urge said rollers selectively against either one said camming ring or the other said camming ring to angularly cant said rollers in one direction and in the other direction selectively as desired relative to said shaft to change the applied angle of said rollers relative to said shaft to cause said shaft to move in one axial direction and the opposite direction as desired; and means preventing rotational movement of said shaft so that the angular application of force of said rollers as they rotate and revolve around said shaft with said hub, rings and sleeve causes axial movement of said shaft in the desired direction.

6. A device for selectively axially moving a hub comprising a rotatably disposed shaft, means preventing axial movement of said shaft, means for rotatably driving said shaft, a socketed sleeve freely disposed on said shaft, rollers having a ball portion and opposite ends disposed in said sleeve sockets, a hub disposed around said sleeve in contact with said roller ball portion on the radially outer side of said rollers, paired opposed camming rings on said shaft contacting said roller ball portion radially inwardly of said rollers; and axial push-pull means on said sleeve selectively moving said sleeve to urge said rollers selectively against either one said camming ring or the other said camming ring to angularly cant said rollers in one direction and in the other direction selectively as desired relative to said hub to change the applied angle of said rollers relative to said hub to cause said hub to move in one axial direction and the opposite direction as desired; and means preventing rotational movement of said hub so that the angular application of force of said rollers as they rotate and revolve around said hub with said shaft, rings and sleeve causes axial movement of said hub in the desired direction.

7. A mechanical rotary to lineal motion converter device comprising a rotatable hollow hub, means rotationally supporting said hub, means axially positioning said hub, rotational drive means on said hub, paired spaced opposed camming rings in said hub, rollers in said hub each having an axis and curved cam portions riding said camming rings, a shaft disposed in said hub having an axis and a peripheral surface helically engaging each said roller curved portion, means on said shaft for engaging other means permitting axial shaft movement and preventing rotational shaft movement, race means in said hub freely surrounding said shaft having sockets endwise abutting and circumferentially variably caging each said roller; and means on said race means for engaging other means to move said race means against each said roller; said camming rings exerting force on each said roller curved portions camming said roller curved portion into forced radial engagement with said shaft surface; each said roller axis normally lying parallel to said shaft axis with each said roller curved portion at no helix angle relative to said shaft surface effecting no axial thrust on said shaft in conjunction with relative rotational movement; movement of said race means causing said roller to cant with its axis at an angle to said shaft axis with said roller curved portion at a helix angle to said shaft surface describing a helix on said shaft surface which in conjunction with relative rotational movement thrusts said shaft axially.

References Cited in the file of this patent
UNITED STATES PATENTS

| | | |
|---|---|---|
| 2,152,518 | Wolff | Mar. 28, 1939 |
| 2,382,105 | Sarver | Aug. 14, 1945 |
| 2,940,322 | Uhing | June 14, 1960 |
| 2,973,671 | Elkina | Mar. 7, 1961 |